United States Patent [19]

Hadfield

[11] Patent Number: 5,049,702
[45] Date of Patent: Sep. 17, 1991

[54] AFTERSET

[75] Inventor: Robert W. Hadfield, Parkersburg, W. Va.

[73] Assignee: Butler Manufacturing Company, Kansas City, Mo.

[21] Appl. No.: 439,624

[22] Filed: Nov. 21, 1989

[51] Int. Cl.$^5$ ............................................. H02G 3/22
[52] U.S. Cl. ..................................................... 174/48
[58] Field of Search ........................ 174/48, 49; 52/221

[56] References Cited

U.S. PATENT DOCUMENTS

| 3,751,576 | 8/1973 | Klinkman et al. | 174/48 |
| 4,443,654 | 4/1984 | Flachbarth et al. | 174/48 |
| 4,770,643 | 9/1988 | Castellani et al. | 174/48 X |
| 4,827,080 | 5/1989 | Castellani et al. | 174/48 |

Primary Examiner—Leo P. Picard
Assistant Examiner—David A. Tone
Attorney, Agent, or Firm—Frederick J. Olsson

[57] ABSTRACT

An afterset comprising a plastic flush floor fitting assembly to service a work station with high and/or low tension, a metal attaching ring clamped to an in-floor duct, and screws bearing on the assembly and threaded into the attaching ring.

7 Claims, 3 Drawing Sheets

AFTERSET

This invention relates to electrical distribution systems for office buildings which employ metal underfloor duct or raceways carrying high tension and low tension cable to supply service at work stations on the floor.

More particularly, the invention relates to an afterset for use in bringing cable from a duct embedded in the concrete out to a work station on the floor surface.

The invention contemplates a low-cost afterset which has essentially two major components. One is a flush floor fitting assembly made of molded plastic parts and the other is a die cast metal retainer means adapted to be clamped to the metal duct. The two parts are secured by standard screws which pull the flush floor fitting down against the floor surface. The flush floor fitting is easily adaptable for a single duplex or double duplex or for the exiting low tension cable.

The details of the afterset will be described below in connection with the following drawings wherein.

Figure 1:
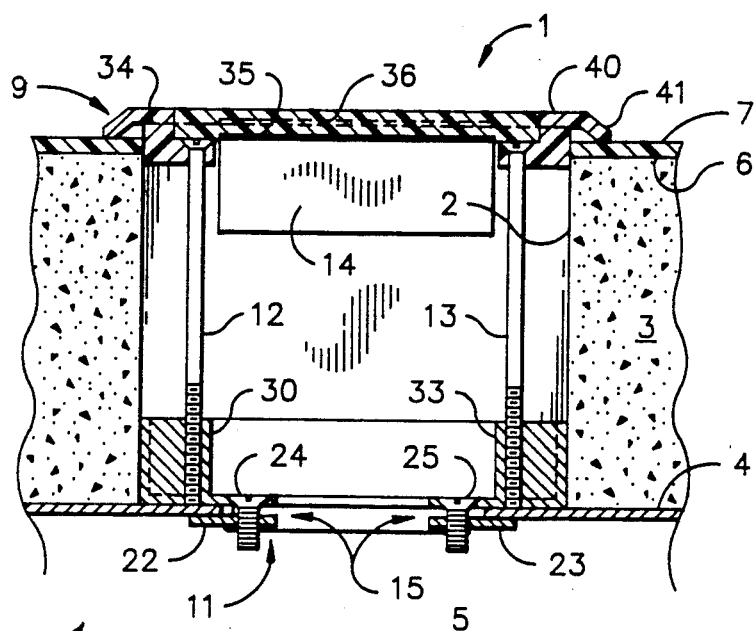
FIG. 1 is an elevational view partially in section of the afterset mounted in a concrete floor.

Referring to FIG. 1, the afterset 1 is shown as mounted in a bore 2 of a concrete floor 3, the afterset being mounted on and clamped to the top 4 of a duct or raceway 5. In the illustration, the top finish surface 6 of the concrete has a floor covering 7.

The afterset includes the flush floor fitting assembly 9 which interengages with the floor surface 6 via the floor covering 7, an attaching ring 10 which is connected to the duct 5 by the clamp or lock means 11, and a plurality of holding screws, two which are indicated at 12 and 13 for securing the flush floor fitting assembly 9 to the attaching ring. The flush floor fitting mounts a duplex receptacle as indicated at 14. The attaching ring is aligned with an access opening 15 in the top 4.

The details of the above mentioned components will now be described.

The receptacle is of conventional form having a main body and a pair of access heads for receiving the blades of a plug.

Figure 2:
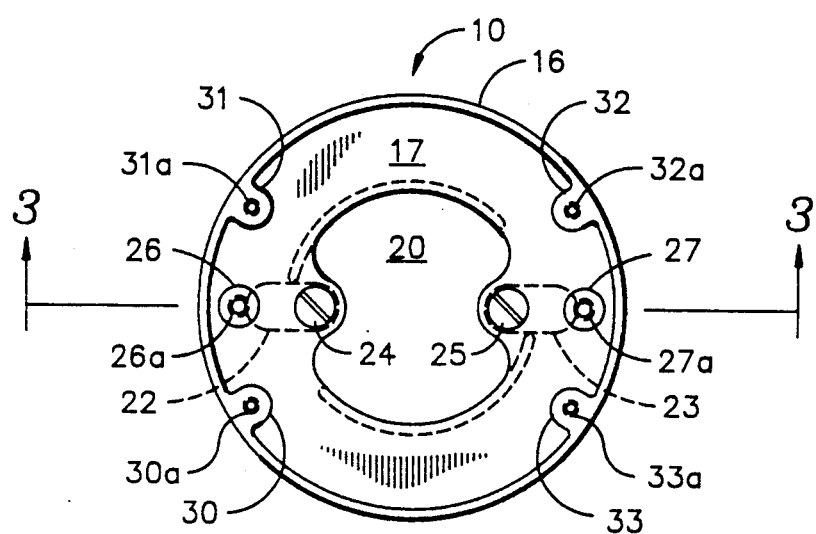
FIG. 2 is a plan view of an attaching ring.
Figure 3:
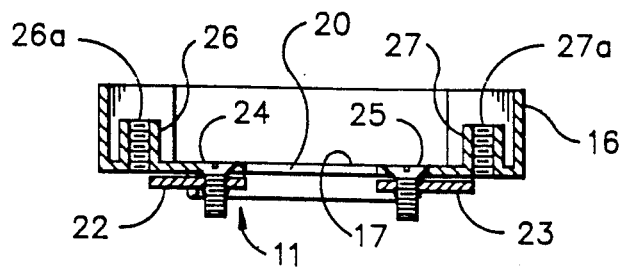
FIG. 3 is an elevational view partially in section taken along the line 3—3 of FIG. 2.

The metal attaching ring or retainer 10 is die cast from ZAMAK No. 3 illustrated in FIGS. 2 and 3. The ring includes a hollow tubular body 16 and an annular base 17 on the lower end of the body with the base being formed with an opening 20. When the attaching ring is mounted on the raceway, the opening 20 is aligned with the raceway access opening 15.

The base 17 carries the clamping or locking means 11 to secure the attaching ring to the duct. The locking means 21 is of the kind as shown in U.S. Pat. No. 3,322,442 assigned to the assignee of this invention. The fingers 22 and 23 can be actuated by screws 24 and 25 to rotate the fingers into the opening 20 or underneath the top 4 of the duct as shown in FIG. 1 and tightened up so that the attaching ring is clamped or locked in place. The foregoing permits the attaching ring to be dropped through the bore and then locked.

Extending upwardly from the base 17 are a pair of grounding posts 26 and 27 each having a threaded aperture as indicated at 26a and 27a. These apertures are used to receive screws which connect one end of a receptacle grounding wire to the post and, thus, ground the receptacle to the system. There are two posts in the event two receptacles are employed.

Also extending up from base 17 are four holding posts 30, 31, 32, and 33. Each has a threaded aperture as indicated at 30a, 31a, 32a, and 33a. These holding post apertures receive holding screws as noted in FIG. 1 wherein the screws 12 and 13 are threaded in the posts 30 and 33.

The flush floor fitting 9 will next be described.

As noted in FIG. 1, this fitting has three main parts, namely, a generally flat, annular member or ring 34, a membrane or gasket 35 mounted in the ring 34, and a conductor access plate 36 mounted on the gasket. The ring 34 and plate 36 are molded from LEXAN plastic. The membrane is molded from EPDM. Note that the ring 34 and access plate 36 are substantially slush with the floor covering 7.

Figure 4:
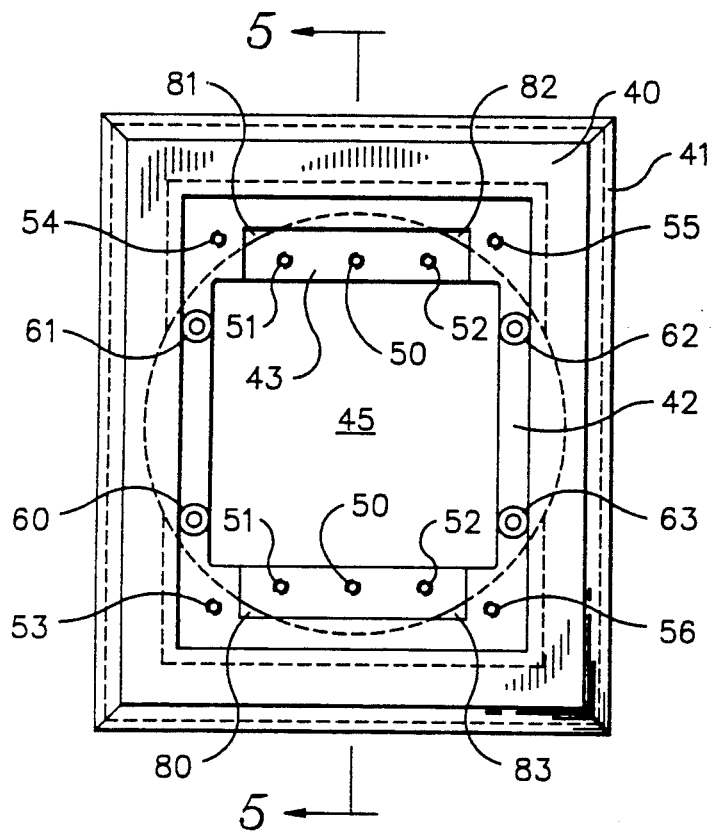
FIG. 4 is a plan view of a flat annular plate used in the afterset of FIG. 1.
Figure 5:
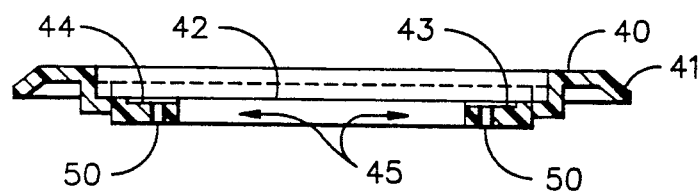
FIG. 5 is an elevational view taken along the line 5—5 of FIG. 4.

The structure of the ring 34 is shown in FIGS. 4 and 5. The ring 34 includes a flat top section 40, a tapered outwardly extending peripheral flange 41, an annular shoulder 42, and a pair of oppositely disposed cavities 43 and 44. The shoulder forms an opening 45 which is aligned with the bore 2. As noted in FIG. 1, the flange overlies the floor covering 7.

The cavities 43 and 44 have respectively a pair of threaded center apertures 50 and two pair of threaded outboard cavities 51 and 52.

The ring 34 is dimensioned so that a single duplex or a pair of duplex receptacles can be mounted on same. For a single duplex the threaded pair 50 is used to mount the receptacle and for a pair of duplexes the threaded pairs 51 and 52 are used for mounting. The cavities 43 and 44 are sufficiently recessed so that the tabs of the receptacles are flush with the shoulder 42.

On the shoulder 42 are four threaded apertures 53, 54, 55, and 56. These are for receiving holddown screw: for the conductor plate. Also on the shoulder are four chamfered clearance apertures 60, 61, 62, and 63 to receive the holddown screws 12 and 13, etc.

It will be apparent from an inspection of FIG. 1 that when the attaching ring is locked on the duct and the holding screws 12, 13, etc. are tightened up, the flange 41 will be pulled down tightly against the floor covering 7.

Figure 6:
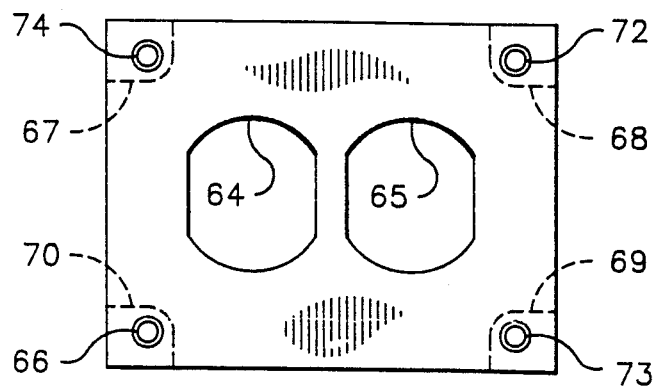
FIG. 6 is a plan view of an access plate for use with a single duplex receptacle as may be used in the afterset of FIG. 1.
Figure 7:
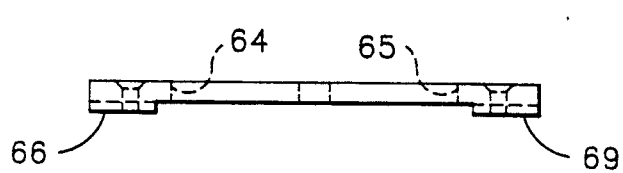
FIG. 7 is a side view of the access plate of FIG. 6.

The conductor access plate 36 will be described in connection with FIGS. 6 and 7.

The plate 36 is designed for a single duplex receptacle. The plate is essentially flat and has a pair of openings 64 and 65 dimensioned to receive the access head: of a duplex receptacle. Each opening is also dimensioned to receive a part of a membrane which surrounds the receptacle access head as noted below.

On the respective corners of the access plate are the downwardly extending feet 66, 67, 68, and 69. The access plate also has four chamfered clearance apertures 70, 71, 72, and 73 which extend down through the feet. These apertures receive holddown screws which are threaded into the threaded apertures 53–56 in the ring 34.

Figure 8:
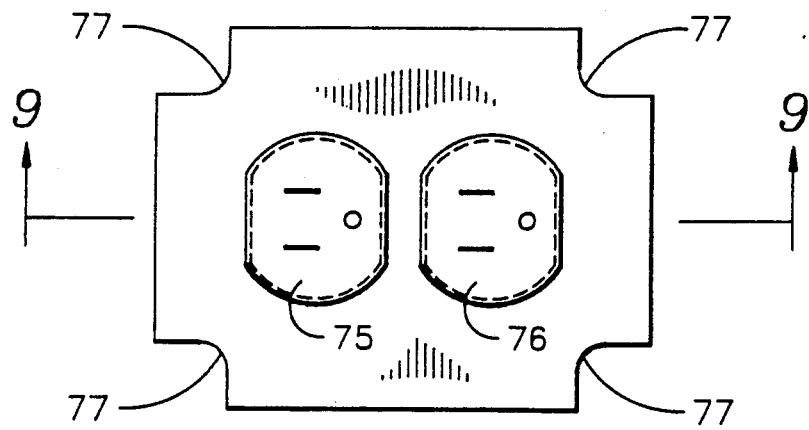
FIG. 8 is a plan view of one form of gasket which may be employed in the afterset of FIG. 1.
Figure 9:
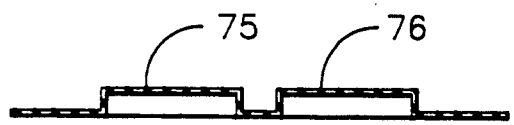
FIG. 9 is an elevational view taken along the line 9—9 of FIG. 8.

The preferred membrane or gasket means 35 is the kind shown in copending application Ser. No. 391,947 of T.S. Bowman filed Aug. 10, 1989 and assigned to the assignee of this invention. The membrane herein is shown in detail in FIGS. 8 and 9 and has a flat body 74 and raised sections 75 and 76 each dimensioned to fit over an access head of a duplex receptacle and also to fit into the openings 64 and 65 in the access plate. Each of the four corners of the membrane is cut away as indicated at 77. After a receptacle (or receptacles) is mounted on the cavities 43 and 44, the membrane is placed down on the shoulder 42.

Then the access plate 36 is placed down over the membrane with the feet 66–69 in the respective cutouts 77. The membrane will cover the opening 45 with the raised sections 75 or 76 over the receptacle access heads and extend into openings 64 and 65. The access plate is then secured in place with holddown screws in the clearance apertures 70–73 and threaded into the apertures 53–56 in the shoulder 42. The foregoing description concerned the power service at the work station. For low tension service at the work station, a different access plate and gasket are employed. The access plate used is of the type shown in my copending application Ser. No. 222,054 filed July 20, 1988 and assigned to the assignee of this invention.

Figure 10:
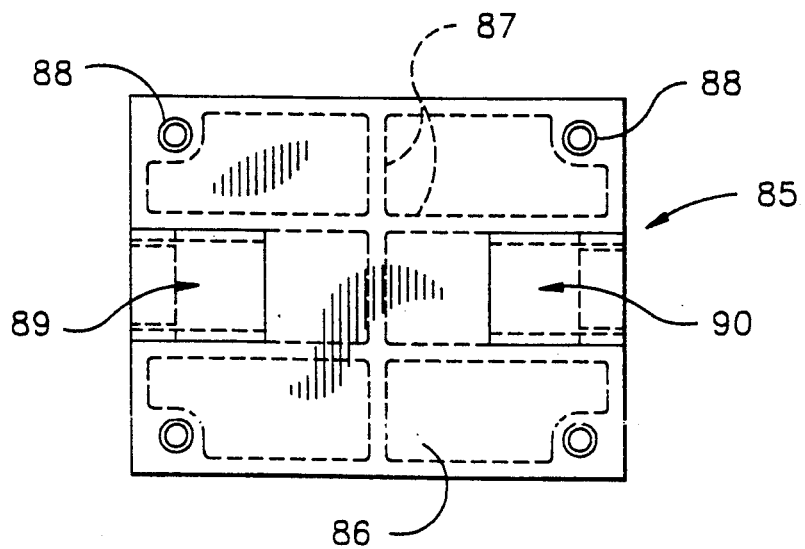
FIG. 10 is a plan view of an access plate configured for the passage of low tension cable as may be used in the afterset of FIG. 1.

The access plate herein is shown in FIG. 10. I have not shown the gasket since this is simply a rectangular ring having a width the same as the narrowest part of the shoulder 42.

For use in low tension application, the ring 34 is modified by removing the portions of the shoulder 42 forming cavities 43 and 44 to provide exit clearance for the low tension cable. For this purpose, the corners of the cavities 43 and 44 have breakaway cutouts 80, 81, 82, and 83 which permit the cavities to be broken away.

Referring back to FIG. 10, the plate 85 has a flat top 86 and a ribbed underside as noted at 87. The plate has clearance apertures 88 to receive holddown screws. The track and slider arrangements 89 and 90 are of the kind shown in my copending application Ser. No. 222,054. The respective sliders cover or uncover openings in the plate 85 for the exit of low tension cable or cover the opening when the fitting is inactive. The slider in arrangement 89 is positioned to cover the opening. The slider in arrangement 90 has been turned over and is ready to be moved to the left to uncover the opening.

I claim:

1. For conveying high and/or low tension conductors through a bore in a concrete floor from an electrical raceway embedded in the floor to a work station on the floor surface, an afterset comprising:
   a metal attaching ring to be mounted in said bore on the top of said electrical raceway in alignment with an access hole therein;
   locking means on said attaching ring and having means for securing the ring to the top in said electrical raceway while the raceway is embedded in the concrete;
   said attaching ring comprising a hollow tubular body and a base on the lower end of the body with the base having an opening to be in alignment with an access hole on the top of an electrical raceway when the attaching ring is mounted thereon;
   a plurality of holding posts on said base and each having a threaded hole for receiving a holding screw means;
   a flush floor fitting assembly to be located on the floor surface adjacent said bore to serve said work station including a generally flat annular member having a central opening and an outwardly extending peripheral flange to interengage said floor, also including a generally flat, conductor-access plate extending across said opening, the annular member and conductor-access plate being formed of plastic material and dimensioned to be substantially flush with the floor surface; and
   a plurality of holding screw means, the heads of which bear on said annular member and the threads of which are respectively threaded in said holding posts.

2. The afterset of claim 1 further including:
   at least one grounding post on said base and having a threaded hole for receiving a grounding screw.

3. The afterset of claim 2:
   further including at least one duplex receptacle mounted on said annular member and extending across said central opening; and
   wherein said conductor access plate has at least a pair of openings, each for receiving an access head of said receptacle.

4. The afterset of claim 1 wherein said conductor access plate has at least one opening, a slider mounted in the opening, and means providing for the slider to be moveable to a position to close off the opening and moveable to a position to uncover the opening for the passage of low tension cable.

5. In combination:
   a building floor comprising a layer of concrete and at least one electrical raceway embedded in the concrete, the concrete having a top finish surface with a floor covering thereon and the raceway having a top surface substantially parallel thereto;
   an access hole in the top surface of said raceway;
   a bore extending through said concrete layer and open to and in alignment with said access hole;
   an attaching ring in said bore and mounted on said top surface and open to and in alignment with said access hole;
   locking means on said attaching ring and being in engagement with the underside of said top surface;
   at least one grounding post on said attaching ring and having a threaded aperture for a grounding screw;
   a plurality of holding posts on said attaching ring, each having a threaded holding screw aperture;
   a generally flat annular member;
   a peripheral flange on said annular member engaging said floor covering;
   a shoulder formed on said annular member and having a central opening which is open to and aligned with said bore;
   a plurality of clearance apertures in said shoulder;
   a plurality of holding screws respectively extending through said clearance apertures in said shoulder, the head of each screw engaging the shoulder and the threaded shank of which is threaded in a holding screw aperture;

a plurality of threaded holddown screw apertures formed in said shoulder;

gasket means mounted on said shoulder;

substantially flat, conductor-access plate mounted on said gasket means, the access plate being formed with at least one opening for the passage of electrical conductors and the access plate having a plurality of holddown screw clearance apertures; and a plurality of access plate, holddown screws, the head of each screw engaging the access plate and the threaded shank of which is threaded in the holddown screw aperture.

6. The combination of claim 5 further including:

a pair of oppositely disposed cavities formed on said shoulder and each being adjacent said central opening, the cavities being for use in supporting at least one receptacle.

7. The combination of claim 6 wherein there are cutouts formed in said shoulder providing for the portions of the shoulder forming said cavities to be broken away.

* * * * *